United States Patent [19]

Hori et al.

[11] Patent Number: 4,500,683

[45] Date of Patent: Feb. 19, 1985

[54] PRESSURE-SENSITIVE ADHESIVE COMPOSITION

[75] Inventors: Yutaka Hori; Makoto Sunakawa; Kikuo Takayama; Naoki Matsuoka; Yutaka Moroishi, all of Osaka, Japan

[73] Assignee: Nitto Electric Industrial Co., Ltd., Osaka, Japan

[21] Appl. No.: 618,329

[22] Filed: Jun. 8, 1984

Related U.S. Application Data

[63] Continuation of Ser. No. 177,046, Aug. 11, 1980, abandoned.

[30] Foreign Application Priority Data

Aug. 11, 1979 [JP] Japan ............................... 54-102532

[51] Int. Cl.$^3$ ...................... C08L 51/04; C08L 33/08; C08L 33/10
[52] U.S. Cl. .................................. 524/533; 525/244; 525/301; 525/303; 525/308; 525/309; 525/85; 427/208.4
[58] Field of Search .................. 525/309, 301, 308; 427/208.4; 524/533

[56] References Cited

U.S. PATENT DOCUMENTS

| | | | |
|---|---|---|---|
| 2,884,126 | 4/1959 | Ulrich | 206/59 |
| 2,916,469 | 12/1959 | Lal | 525/308 |
| 2,956,904 | 10/1960 | Hendricks | 427/208.4 |
| 2,973,286 | 2/1961 | Ulrich | 524/384 |
| 3,235,621 | 2/1966 | Burrell | 525/309 |
| 3,405,087 | 10/1968 | Fryd | 525/309 |
| 3,547,852 | 12/1970 | Burke | 524/320 |
| 3,617,361 | 11/1971 | Reinhard et al. | 427/208.4 |
| 3,657,396 | 4/1972 | Kuramoto et al. | 427/208.4 |
| 3,687,884 | 8/1972 | Huang | 525/301 |
| 3,729,338 | 4/1973 | Lehmann et al. | 427/208.4 |
| 4,165,266 | 8/1979 | Stueben et al. | 204/159.15 |

FOREIGN PATENT DOCUMENTS 53-46337   4/1978   Japan ................................. 525/309

OTHER PUBLICATIONS

Laus F. Martin, Pressure Sensitive Adhesives, Formulations and Technology, pp. 2–68, 1974.

*Primary Examiner*—Carman J. Seccuro
*Attorney, Agent, or Firm*—Sughrue, Mion, Zinn, Macpeak and Seas

[57] ABSTRACT

A pressure-sensitive adhesive composition containing as a polymer component an addition-polymerization polymer of an acryl-based polymer having sticking properties at room temperature and one or more ethylenically unsaturated monomers capable of forming a homo- or co-polymer having a glass transition point of at least 273° K.; the addition-polymerization polymer is prepared by polymerizing one or more ethylenically unsaturated monomers in the presence of the acryl-based polymer; the present pressure-sensitive adhesive composition has high adhesive strength and cohesive strength.

17 Claims, No Drawings

PRESSURE-SENSITIVE ADHESIVE COMPOSITION

This application is a continuation of application Ser. No. 177,046, filed 8/11/80, now abandoned.

BACKGROUND OF THE INVENTION

1. Field of the Invention

This invention relates to an acryl-based pressure-sensitive adhesive composition.

2. Description of the Prior Art

Recently an acryl-based pressure-sensitive adhesive has widely been used in place of conventional natural rubber based and synthetic rubber based pressure-sensitive adhesives, because of its excellent adhesion characteristics and durability. See, for example, U.S. Pat. No. 2,973,286. This acryl-based pressure-sensitive adhesive is composed mainly of an acryl-based polymer which has sticking properties at room temperature and which is generally produced by the solution polymerization of an acryl monomer, such as acrylate, methacrylate, etc., if necessary, in combination with a modifying monomer, such as acrylic acid, maleic acid, acrylamide, styrene, vinyl acetate, etc.

Such an acryl-based polymer, however, has generally poor cohesive strength and, therefore, it has usually been required to be crosslinked by use of a crosslinking agent, e.g., a phenol resin, a melamine compound, an isocyanate compound, an epoxy compound, metallic ions, etc. Such crosslinking or modification give rise to problems in respect of quality and productivity, for example, some of such crosslinking agents reduce the moisture resistance and heat resistance of the adhesive. Also, the drop in adhesion strength owing to the improvement in cohesive strength owing to the improvement in cohesive strength and the heat energy required for the crosslinking are sometimes significant; and the selection of a suitable crosslinking agent and the determination of the appropriate amount thereof to be added require much time and labor.

It has, therefore, been the subject of long and continuing research to develop novel acryl-based pressure-sensitive adhesives which are able to provide both high cohesive strength and high adhesive strength without using crosslinking agents.

SUMMARY OF THE INVENTION

It has now been found according to this invention that polymers obtained by post-polymerization of acryl-based polymers with specific unsaturated monomers, said acryl-based polymer being producable by hitherto known methods and being viscous at room temperature, provide pressure-sensitive adhesives which are very satisfactory in both cohesive strength and adhesive strength.

This invention, therefore, provides a pressure-sensitive adhesive composition containing an addition-polymerization polymer which is obtained by homo- or co-polymerizing one or more ethylenically unsaturated monomers in the presence of an acryl-based polymer having sticking properties at room temperature, said ethylenically unsaturated monomer being capable of providing homo- or co-polymers having glass transition points of at least 273° K., and said addition-polymerization polymer comprising the acryl-based polymer as a polymer component and the ethylenically unsaturated monomer additionally bonded thereto.

DETAILED DESCRIPTION OF THE INVENTION

The pressure-sensitive adhesive composition of this invention comprises an addition-polymerization polymer consisting of an acryl-based polymer as a polymer component, said acryl-based polymer having sticking properties at room temperature, ethylenically unsaturated monomer bonded thereto, the homopolymer (or copolymer) of the ethylenically unsaturated monomer(s), and unreacted acryl-based polymer.

Mainly, as a result of the presence of the addition-polymerization polymer, no crosslinking agents are required, or the cohesive strength is markedly improved by the use of only a small amount of crosslinking agent. Furthermore, almost no adverse influences are exerted on the adhesive strength of the acryl-based polymer prior to the addition-polymerization.

The reasons for this are not completely clear, but it is believed that the presence of the addition-polymerization polymer greatly contributes to the improvement in cohesive strength and the maintainance of the adhesive strength (i.e., the adhesion properties), on the basis of the factors discussed below.

If the homopolymer (or copolymer) of a specific unsaturated monomer as used in this invention is merely blended with an acryl-based polymer having sticking properties, no marked improvement in cohesive strength is observed, but the drop in adhesive strength is significant. Furthermore, where a specific unsaturated monomer as used in this invention is added to an acryl-based polymer having sticking properties during the polymerization thereof and is copolymerized therewith, the polymer obtained is extremely inferior in all of the adhesive strength, bond strength, and cohesive strength.

Any acryl-based polymers which are used as a base polymer for hitherto known acryl-based pressure-sensitive adhesives can be used as the acryl-based polymer having sticking properties at room temperature, as used in this invention.

In general, those copolymers usually having average molecular weights of more than about 100,000 which are produced by the solution-polymerization of esters of acrylic acid or methacrylic acid and alcohols containing 12 or less carbon atoms and modifying monomers are preferably employed in this invention.

Examples of such modifying monomers are vinyl chloride, vinyl propionate, maleic acid mono- or di-ester, acrylic acid, methacrylic acid, crotonic acid, maleic acid, itaconic acid, 2-hydroxyethyl acrylate, 2-hydroxypropyl acrylate, 2-hydroxyethyl methacrylate, N,N-dimethylaminoethyl acrylate, N,N-dimethylaminoethyl methacrylate, N-tert-butylaminoethyl acrylate, bis(N,N-dimethylaminoethyl)maleate, acrylamide, methacrylamide, N-methylolacrylamide and glycidyl acrylate.

The ethylenically unsaturated monomers which are polymerized in the presence of the acryl-based polymer as described above are those unsaturated monomers, the homo- or co-polymers of which have glass transition points of at least 273° K., and preferably at least 300° K. With those unsaturated monomers which provide homo- or co-polymers having glass transition points of less than 273° K., no sufficient improvement in cohesive strength can be obtained.

Mixtures of unsaturated monomers which provide copolymers having glass transition points of at least 273° K. include a mixture of monomers, each of which is able to provide a homopolymer having a glass transition point of at least 273° K., and a mixture of monomers, one of which is able to provide a homopolymer having a glass transition point of at least 273° K. and the other provides a homopolymer having a glass transition point of 273° K. or less. In the case of the latter monomer mixture, any composition ratio can be employed so long as it provides a copolymer having a glass transition point of at least 273° K.

Particularly suitable unsaturated monomers have been found to be members of the group consisting of styrene, vinyl acetate, acrylonitrile, and methacrylonitrile, each of which provides a homopolymer having a glass transition point of at least 300° K. and acrylate derivatives, methacrylate derivatives, and styrene derivatives, each of which provide a homopolymer having a glass transition point of at least 273° K. Hereinafter, these unsaturated monomers belonging to the foregoing group are designated as "Component A monomers".

Representative examples of derivatives of unsaturated monomers as described above include cyclohexyl acrylate (289° K.), methyl acrylate (270° K.), butyl methacrylate (293° K.), N,N-dimethylaminoethyl methacrylate (289° K.), hexadecyl methacrylate (288° K.), 2-methoxyethyl methacrylate (286° K.), 4-butylstyrene (279° K.), 2-butyl methacrylate (318° K.), 3,3-dimethylbutyl methacrylate (318° K.), 3,3-dimethyl-2-butyl methacrylate (381° K.), ethyl methacrylate (338° K.), glycidyl methacrylate (319° K.), isoboronyl methacrylate (383° K.), isobutyl methacrylate (326° K.), isopropyl methacrylate (354° K.), methyl methacrylate (378° K.), phenyl methacrylate (378° K.), n-propyl methacrylate (308° K.), isoboronyl acrylate (367° K.), 4-tert-butylstyrene (403° K.), 2,4-dimethylstyrene (416° K.), 3,4-diethylstyrene (382° K.), 2-hydroxymethylstyrene (433° K.), 4-methylstyrene (366° K.), 2-methylstyrene (366° K.), and the like. The figure in the parenthesis indicates the glass transition point of the homopolymer obtained from the unsaturated monomer.

Of the unsaturated derivatives of monomers, those unsaturated monomers capable of providing homopolymers having glass transition points of at least 300° K. are preferred and the optimum one is methyl methacrylate.

The unsaturated monomers and derivatives thereof noted above may be selected depending upon the type of acryl-based polymer desired to be used. These Component A monomers may be used in combination with other unsaturated monomers which are copolymerizable with the Component A monomers and are able to provide copolymers having glass transition points of at least 273° K. (these other unsaturated monomers are hereinafter referred to as "Component B monomers").

As such Component B monomers, one or more of those monomers which are used in conventional acryl-based pressure-sensitive adhesives can be used, such as acrylic acid, methacrylic acid, itaconic acid, etc., which provide homopolymers having glass transition points of at least 273° K. and butyl acrylate, ethyl acrylate, 2-ethylhexyl acrylate, etc., which provide homopolymers having glass transition points of less than 273° K.

The amount of the Component B monomer is determined according to the types of the Component A monomer and Component B monomer used, since it is one of the factors determining the glass transition point of the copolymer to be obtained. If the Component B monomer is used in excessive amounts, it interferes with the marked improvement in cohesive strength, resulting from the use of the Component A monomer. Therefore, the amount of the Component B monomer being added should be controlled to not more than 50% by weight, and preferably not more than 30% by weight, based on the total unsaturated monomer weight.

For the polymerization of the ethylenically unsaturated monomer in the presence of the acryl-based polymer having sticking properties at room temperature, any of a solution polymerization wherein the polymerization is carried out in an organic solvent and a bulk polymerization wherein no solvent is used can be employed.

The solution polymerization method produces the following advantages:

The workability of the polymerization is good; the organic solvent used acts efficiently as a chain transfer agent for the polymerization, preventing the addition-polymerization from taking place excessively; the gelation of the acryl-based polymer during the addition-polymerization which occurs, in particular, when the acryl-based polymer has a high inherently molecular weight, can be prevented; and the addition-polymerization polymer and the homopolymer (or copolymer), having suitable molecular weights can be produced in a suitable ratio.

Organic solvent which can be used in the solution polymerization method include toluene, benzene, xylene, hexane, heptane, n-octane, isooctane, ethyl acetate, acetone, methyl ethyl ketone, methanol, ethanol and isopropanol. Toluene or mixed solvents containing at least 50% by weight toluene are particularly preferred from the point of the workability of the polymerization. Organic solvents which are used in the formation of the acryl-based polymer having viscosity properties at room temperature can be used as it is as such an organic solvent.

The amount of the organic solvent used is usually from 5 parts by weight to 900 parts by weight, and preferably from 25 parts by weight to 400 parts by weight, per 100 parts by weight of the aryl-based polymer. In greater amounts, the amount of the addition-polymerization polymer being formed decreases, whereas the amount of the homopolymer increases and, therefore, the effect of this invention cannot be sufficiently obtained.

In determining the amount of the organic solvent to be used, it is preferred to take into consideration the type of the ethylenically unsaturated monomer, the ease of chain transfer of the organic solvent to monomer radical, the composition and molecular weight of the acryl-based polymer having viscosity properties at room temperature, and the type and amount of the polymerization initiator. For example, where vinyl acetate is used as an ethylenically unsaturated monomer, it is preferably added in an amount of from 5 parts by weight to 70 parts by weight per 100 parts by weight of the acryl-based polymer, and where the Component A monomer except for vinyl acetate is used, it is preferably added in an amount of from 5 parts by weight to 400 parts by weight.

Where organic solvents having small chain transfer constants, such as ethyl acetate, benzene, etc., or an acryl-based polymer having a very high molecular weight is used, it is preferred to increase the amount of the organic solvent being used. On the other hand, where organic solvents having large chain transfer constants, such as toluene, isopropanol, etc., are used or an acryl-based polymer having relatively low molecular weight is used, it is preferred to lower the amount of the organic solvent being used. Particularly, in the case of toluene or a mixed solvent containing at least 50% by weight toluene, it is preferred to add in an amount of from 5 parts by weight to 400 parts by weight, and especially preferably from 25 parts by weight to 250 parts by weight, per 100 parts by weight of the acryl-based polymer.

In the bulk polymerization method, it is desirable to prevent the gelation during the polymerization or to prevent the addition-polymerization from proceeding excessively by employing an acryl-based polymer having as low a molecular weight as possible or by incorporating a suitable chain transfer agent in the polymerization system.

Chain transfer agents which can be used in the above procedure include hitherto known chain transfer agents, such as thioglycol, thioglycolic acid, butylmercaptan and laurylmercaptan. The amount of the chain transfer agent added is preferably from 0.01 to 1.0 part by weight, and more preferably from 0.03 to 0.6 part by weight per 100 parts by weight of the ethylenically unsaturated monomer.

In the solution polymerization or bulk polymerization, the ethylenically unsaturated monomer is used in an amount of 5 to 200 parts by weight, preferably 10 to 150 parts by weight per 100 parts by weight of the acryl-based polymer. In greater amounts, the drop in the adhesive strength is marked, although the cohesive strength can be improved.

Since the optimum amount of the ethylenically unsaturated monomer added varies depending upon various conditions, it should be determined depending upon the composition or molecular weight of the acryl-based polymer used and the type of the ethylenically unsaturated monomer, the polymerization method employed (i.e., solution polymerization method or bulk polymerization method) and in the case of the solution polymerization method, the type of the organic solvent employed so that the gelation during the polymerization is prevented or the addition polymerization is prevented from proceeding excessively, and that the addition-polymerization polymer and the homopolymer (or copolymer) having suitable molecular weights are obtained in a suitable proportion.

In general, it is preferred that when an acryl-based polymer having a high molecular weight is used, the ethylenically unsaturated monomer is added in a smaller amount than in the case of a low molecular weight acryl-based polymer. When the above Component A monomer except for vinyl acetate is used as an ethylenically unsaturated monomer, it is added in a smaller amount than in the case of vinyl acetate. When the bulk polymerization method is employed, the ethylenically unsaturated monomer is added in a smaller amount than in the case of the solution polymerization method. When an organic solvent having a small chain transfer constant is used in the solution polymerization method, the ethylenically unsaturated monomer is added in a smaller amount than in the case of an organic solvent having a large chain transfer constant.

Some of the ethylenically unsaturated monomers contain functional groups which have high reactivity with those contained in the acryl-based polymers. In this case, therefore, the amount of the ethylenically unsaturated monomer added should be determined so as to prevent the gelation resulting from the reaction of the functional groups.

While the polymerization of this invention can be initiated by energy in the form of light, electron rays, etc., it is usually carried out by use of radical polymerization catalysts which are generally used in the formation of acryl-based polymers having sticking properties at room temperature. Such catalysts include azo compounds such as azobisisobutylonitrile and organic peroxides. In particular, the use of organic peroxides permits the improvement of the adhesive strength and cohesive strength.

Examples of such organic peroxides are benzoyl peroxide, cumenhydroperoxide, di-tert-butyl peroxide, tert-butylperoxybenzoate, lauroyl peroxide, tert-butylperoxy 2-ethylhexanoate, methyl ethyl ketone peroxide, cyclohexanenone peroxide and the like.

The amount of the polymerization catalyst being added is generally from 0.01 to 5 parts by weight, and preferably from 0.05 to 3 parts by weight, per 100 parts by weight of the ethylenically unsaturated monomer.

The thus-obtained polymerization product contains, as a polymer component, the homopolymer (or copolymer) of the ethylenically unsaturated monomer and the addition-polymerization polymer comprising the acryl-based polymer and the ethylenically unsaturated monomer additionally bonded thereto. This polymerization product itself shows pressure-sensitive characteristics excellent in both adhesive strength and cohesive strength, and it can be used as is as a pressure-sensitive adhesive.

If desired, a conventional crosslinking agent may be further incorporated in order to further increase the adhesive strength and cohesive strength. Such crosslinking agents include ethyl etherated methylolmelamine, butyl etherated methylolmelamine, trilenediisocyanate, hexamethylenediisocyanate, alkylphenol, zinc acetate, tin chloride, calcium oxide, benzoyl peroxide, diglycidyl ether of bisphenol A and the like.

The amount of the crosslinking agent being added is small, and a sufficient amount can be from 0.001 to 1.5 parts by weight per 100 parts by weight of the acryl-based polymer having sticking properties at room temperature.

To the pressure-sensitive adhesive composition of this invention there can further be added, if desired, known compounding agents such as a coloring agent, a filler, an anti-aging agent, a tackifier, etc. Because of the good adhesive strength and cohesive strength, the pressure-sensitive adhesive composition of this invention can be effectively utilized as a adhesive tape, an adhesive sheet, etc.

The following examples and comparative examples are given to illustrate this invention in greater detail. It is to be noted that this invention is not limited to the examples and various modifications can be made without departing from the scope of this invention. All parts in the examples and comparative examples are by weight.

The adhesive strength and retention strength were measured as follows:

Adhesive Strength

A pressure-sensitive adhesive composition is coated on both sides of 25 $\mu$ thick polyester film in a thickness of 50 $\mu$ and dried at 100° C. for 3 minutes, to produce a two-sided adhesive tape. According to JIS Z-1528, a 180° stripping adhesive strength (g/20 mm) is measured.

Retention Strength

In the same manner as in the adhesive strength testing method, a two-sided adhesive tape is produced. This adhesive tape is placed between two bakelite sheets and adhered thereto over an area of 25×25 mm, then kept at 40° C. under a load of 1 Kg, and the time (minutes) required until the bakelite sheet drops is measured.

EXAMPLE 1

A three-necked flask was charged with 100 parts of a monomer mixture consisting of 100 parts of ethyl acrylate, 100 parts of 2-ethylhexyl acrylate and 10 parts of acrylic acid, 400 parts of benzene and 0.05 part of benzoyl peroxide. The mixture was stirred for 60 minutes while purging with nitrogen and then heated up to 65° C. by which it was caused to polymerize for 7 hours.

The thus-obtained polymer solution contained an acryl-based polymer having sticking properties at room temperature and an average molecular weight of about 50,000 and its adhesive strength and retention strength were respectively 720 g/20 mm and 28 minutes.

The polymer solution was cooled to 50° C. Then, a monomer mixture consisting of 30 parts of styrene and 5 parts of acrylic acid (copolymer of styrene and acrylic acid has a glass transition point of 37° K.) and 1 part of benzoyl peroxide were added to 100 parts of the above acryl-based polymer (corresponding to the number of parts of the monomer mixture). Nitrogen was introduced into flask for 30 minutes to replace the air therein by the nitrogen, and then the temperature was raised to 73° C. at which they were polymerized for 4 hours.

The thus-obtained pressure-sensitive adhesive composition of this invention had an adhesive strength of 850 g/20 mm and a retention strength of 1,000 minutes or more.

For comparison, a copolymer having the same monomer composition as used in the post-polymerization as described above was produced in a benzene solvent and the copolymer solution so-formed was mixed with the above acryl-based polymer solution in the same proportion as in Example 1 to provide an adhesive composition. The adhesive strength and retention strength of this composition were, respectively, 580 g/20 mm and 46 minutes.

EXAMPLE 2

In the same manner as in Example 1 except that 100 parts of a monomer mixture consisting of 100 parts of isooctyl acrylate, 2 parts of maleic acid and 5 parts of methacrylic was used and mixed solvent of toluene and isopropanol (toluene 80% by weight) was used as an organic solvent, the polymerization was carried out. After the reaction, the organic solvent was completely removed by vacuum distillation to obtain an acryl-based polymer having sticking properties at room temperature and an average molecular weight of about 120,000. The adhesive strength and retention strength of this polymer was respectively 820 g/20 mm and 1 minute or less.

To 100 parts of the above polymer there were added 20 parts of methyl methacrylate, 70 parts of vinyl acetate and 0.1 part of lauroyl peroxide. The resulting mixture was stirred in a high viscous stirring apparatus at room temperature for 2 hours while purging with nitrogen, and it was then heated up to 90° C., by which it was caused to polymerize, for 5 hours.

The thus-obtained pressure-sensitive adhesive composition of this invention had an adhesive strength of 760 g/20 mm and a retention strength of 480 minutes.

EXAMPLE 3

A three-necked flask was charged with 100 parts of a monomer mixture consisting of 100 parts of n-butyl acrylate, 100 parts of 2-ethylhexyl acrylate, 20 parts of vinyl acetate, 5 parts of acrylic acid and 10 parts of 2-hydroxyethyl acrylate, 100 parts of a mixed solvent consisting of heptane and toluene (toluene 60% by weight) and 0.03 part of azobisisobutylonitrile. The mixture was stirred for 2 hours in a stream of nitrogen, and the temperature was then raised to 62° C. at which it was caused to polymerize for 10 hours.

The polymer solution so-obtained contained an acryl-based polymer having sticking properties at room temperature and having an average molecular weight of about 230,000, and its adhesive strength and retention strength were respectively 980 g/20 mm and 6 minutes.

To this polymer solution were added a monomer mixture consisting of 50 parts of methyl methacrylate and 3 parts of acrylic acid (glass transition point of methyl methacrylate-acrylic acid copolymer, 376° K.) and 3 parts of cumenehydro peroxide, all parts being based upon 100 parts of the acryl-based polymer. The resulting mixture was stirred for 30 minutes in a stream of nitrogen, and the temperature was then raised to 80° C., by which it was polymerized, for 6 hours.

The pressure-sensitive adhesive composition of this invention had an adhesive strength of 840 g/20 mm and a retention strength of 1,000 minutes or more.

For comparison, a copolymer having the same monomer composition as used in the above post-polymerization was produced in a mixed solvent of heptane and toluene (toluene 60% by weight) and the copolymer solution so-obtained was mixed with the above acryl-based polymer solution in the same proportion as in Example 3 to provide a pressure-sensitive adhesive composition. The adhesive strength and retention strength of the composition were, respectively, 620 g/20 mm and 65 minutes.

EXAMPLE 4

In a three-necked flask were placed 100 parts of a monomer mixture consisting of 100 parts of octyl acrylate and 7 parts of acrylic acid, 200 parts of a mixed solvent of ethyl acetate and ethanol (ethanol 10% by weight) and 0.1 part of benzoyl peroxide. The mixture was stirred for 1 hour in a stream of nitrogen, and the temperature was then raised to 70° C., by which they were polymerized for 5 hours.

The polymer solution so-obtained contained an acryl-based polymer having sticking properties at room temperature and an average molecular weight of about 350,000, and its adhesive strength and retention strength were respectively 810 g/20 mm and 12 minutes.

To this polymer solution were added a monomer mixture of 30 parts of methyl methacrylate and 2.1 parts of acrylic acid (glass transition point of methyl methacrylate-acrylic acid copolymer: 377° K.) and 0.5 part of benzoyl peroxide, all parts being based upon 100 parts of the above acryl-based polymer. Nitrogen was introduced into the flask for 30 minutes to replace the air thereby, and the temperature was then raised to 75° C. at which they were polymerized for 4 hours.

The thus-obtained pressure-sensitive adhesive composition of this invention had an adhesive strength of 890 g/20 mm and a retention strength of 1,000 minutes or more.

For comparison, the same monomer mixture as used in the above post-polymerization was added to the polymerization system in formation of the above polymer solution to produce a polymer solution having a monomer composition consisting of 100 parts of octyl acrylate, 30 parts of methyl methacrylate and 9.1 parts of acrylic acid. The adhesive strength and retention strength of this solution were, respectively, 50 g/20 mm and 1,000 or more.

EXAMPLE 5

The polymer solution obtained in Example 4 was dried under reduced pressure to provide a solution having a solid content of 70% by weight. To this solution were added 50 parts of vinyl acetate and 0.5 part of benzoyl peroxide, all being based upon 100 parts of the acryl-based polymer. Nitrogen was introduced thereinto for 30 minutes to replace the air thereby, and the temperature was then raised to 85° C., by which they were polymerized for 5 hours.

The pressure-sensitive adhesive composition of this invention had an adhesive strength of 920 g/20 mm and a retention strength of 1,000 minute or more.

For comparison, the same monomer as used in the above post-polymerization was added to the polymerization system in the formation of the polymer solution to produce a polymer solution containing an acryl-based polymer having a monomer composition of 100 parts of octyl acrylate, 7 parts of acrylic acid and 50 parts of vinyl acrylate. The adhesive strength and retention strength of this solution were respectively 820 g/20 mm and 35 minutes.

EXAMPLE 6

The polymer solution obtained in Example 4 was dried under reduced pressure to provide a solution having a solid content of 90% by weight. To this solution were added 10 parts of vinyl acetate, 5 parts of 3,3-dimethylbutyl methacrylate and 1 part of benzoyl peroxide, all being based upon 100 parts of the acryl-based polymer. Nitrogen was introduced thereinto for 30 minutes to replace the air thereby, and the temperature was then raised to 75° C. at which they were polymerized for 6 hours.

The thus-obtained pressure-sensitive adhesive composition of this invention had an adhesive strength of 900 g/20 mm and a retention strength of 1,000 minutes or more.

EXAMPLE 7

In a three-necked flask were placed 100 parts of a monomer mixture consisting of 100 parts of octyl acrylate and 7 parts of acrylic acid and 100 parts of benzene. The resulting mixture was stirred for 60 minutes in a stream of nitrogen and the temperature was then raised to 65° C. at which they were polymerized while adding divided portions of 0.1 part of azobisisobutylonitrile.

The thus-obtained polymer solution contained an acryl-based polymer having sticking properties at room temperature and an average molecular weight of about 760,000, and its adhesive strength and retention strength were respectively 680 g/20 mm and 180 minutes.

To this polymer solution were added 20 parts of acrylonitrile and 0.02 part of benzoyl peroxide, all being based upon 100 parts of the acryl-based polymer. Nitrogen was introduced thereinto for 30 minutes to replace the air thereby, and the temperature was then raised to 80° C., by which they were polymerized for 3 hours.

The thus obtained pressure-sensitive adhesive composition of this invention had an adhesive strength of 720 g/20 mm and a retention strength of 1,000 minutes or more.

In the same manner as in Example 7, with the exception that 20 parts of methacrylonitrile was used in place of 20 parts of acrylonitrile in the post-polymerization, a pressure-sensitive adhesive composition was produced. This pressure-sensitive adhesive composition had an adhesive strength of 750 g/20 mm and a retention strength of 1,000 minutes or more.

EXAMPLE 8

In a three-necked flask were placed 100 parts of a monomer mixture consisting of 100 parts of octyl acrylate, 30 parts of ethyl acrylate and 2 parts of acrylic acid, 100 parts of a mixed solvent of toluene and ethyl acetate (toluene 50% by weight) and 0.05 part of azobisisobutylonitrile. The resulting mixture was stirred for 1 hour in a stream of nitrogen, and the temperature was then raised to 65° C., by which they were polymerized for 10 hours.

The polymer solution so-obtained contained an acryl-based polymer having sticking properties at room temperature and an average molecular weight of about 290,000. To 100 parts of this polymer was added 1 of an isocyanate compound (Desmodular L, trademark of Bayer Co.), and the resulting composition had an adhesive strength of 890 g/20 mm and a retention strength of 36 minutes.

To this polymer solution were added a monomer mixture consisting of 10 parts of styrene and 0.3 part of acrylic acid (glass transition point of styrene-acrylic acid copolymer: 370° K.) and 0.1 part of benzoyl peroxide, all being based upon 100 parts of the acryl-based polymer. After the air was replaced by nitrogen, the temperature was raised to 90° C., by which they were polymerized for 5 hours. After the reaction, 0.2 part of an isocyanate compound (Desmodular L, trademark of Bayer Co.) was added.

The thus-obtained pressure-sensitive adhesive composition of this invention had an adhesive strength of 910 g/20 mm and a retention strength of 580 minutes.

In the same manner as in Example 8, with the exception that the amount of each of the monomer and the polymerization catalyst used in the post-polymerization was increased to two times, three times, and five times the original amount, three kinds of adhesive compositions were produced. With all the adhesive compositions, the retention strength was 1,000 minutes or more and the adhesive strength was in the range of from 780 g/20 mm to 820 g/20 mm. When the amount of both the monomer and the polymerization catalyst was increased to eight times the original amount, the cohesive strength was 1,000 minutes or more, but the adhesive strength was 550 g/20 mm; a tendency of the adhesive strength to decrease was observed.

EXAMPLE 9

To the polymer solution obtained in Example 8 were added a monomer mixture consisting of 30 parts of methyl methacrylate, 10 parts of ethyl acrylate and 2 parts of 2-hydroxyethyl acrylate (glass transition point of methyl methacrylate-ethyl acrylate-2-hydroxyethyl acrylate copolymer: 330° K.) and 0.126 part of benzoyl peroxide. They were polymerized at 80° C. for 3 hours in a stream of nitrogen.

The thus-obtained pressure-sensitive adhesive composition of this invention had an adhesive strength of 950 g/20 mm and a retention strength of 650 minutes. This adhesive composition with 0.5 part of zinc acetate added thereto had an adhesive strength of 790 g/20 mm and a retention strength of 1,000 minutes or more; and the adhesive composition with 0.1 part of butyl etherated methylolmelamine added thereto had an adhesive strength of 950 g/20 mm and a retention strength of 1,000 minutes or more.

EXAMPLE 10

To the polymer solution obtained in Example 8 were added a monomer mixture consisting of 30 parts of 4-methylstyrene and 3 parts of acrylic acid and 0.3 part of benzoyl peroxide, all being based upon 100 parts of the acryl-based polymer (glass transition point of 4-methylstyrene-acrylic acid copolymer: 366° K.). Hereinafter, in the same manner as in Example 8, the polymerization was carried out. After the reaction, 1 part of Desmodur L was added thereto to provide a pressure-sensitive adhesive composition of this invention.

The thus-obtained adhesive composition had an adhesive strength of 800 g/20 mm and a retention strength of 1,000 minutes or more.

EXAMPLE 11

By using a monomer mixture consisting of 90 parts of 2-ethylhexyl acrylate and 10 parts of acrylic acid, an acryl-based polymer having sticking properties at room temperature and an average molecular weight of about 400,000 was produced in the same manner as in Example 2. The polymer so-obtained had an adhesive strength of 780 g/20 mm and a retention strength of 15 minutes.

To 100 parts of this polymer were added 100 parts of methyl acrylate and 1 part of cumenehydro peroxide. The resulting mixture was stirred for 3 hours at room temperature while purging with nitrogen, and the temperature was then raised to 90° C., by which the polymerization was carried out. After the reaction was completed, toluene was added thereto to control the solid content to 15% by weight.

The thus-obtained pressure-sensitive adhesive composition of this invention had an adhesive strength of 1,020 g/20 mm and a retention strength of 385 minutes.

EXAMPLE 12

To 100 parts of the acryl-based polymer obtained in Example 11 were added 100 parts of a monomer mixture consisting of 70 parts of methyl methacrylate, 20 parts of ethyl acrylate and 10 parts of acrylic acid (glass transition point of copolymer: 345° K.) and 1 part of benzoyl peroxide, which were polymerized in the same manner as in Example 11.

The thus-obtained pressure-sensitive adhesive composition of this invention had an adhesive strength of 780 g/20 mm and a retention strength of 1,000 minutes or more.

EXAMPLE 13

To 100 parts of the acryl-based polymer obtained in Example 11 were added 150 parts of a monomer mixture consisting of 60 parts of methyl methacrylate, 30 parts of 2-ethylhexyl acrylate (glass transition point of copolymer: 314° K.) and 1 part of benzoyl peroxide, which were polymerized in the same manner as in Example 11.

The resulting pressure-sensitive adhesive composition of this invention had an adhesive strength of 860 g/20 mm and a retention strength of 1,000 minutes or more.

COMPARATIVE EXAMPLE 1

To the acryl-based polymer obtained in Example 11 were added 100 parts of ethyl acrylate (glass transition point of ethyl acrylate homopolymer: 250° K.) and 1 part of benzoyl peroxide, and they were polymerized in the same manner as in Example 11.

The thus-obtained pressure-sensitive adhesive composition had an adhesive strength of 760 g/20 mm and a retention strength of 25 minutes.

COMPARATIVE EXAMPLE 2

To the acryl-based polymer obtained in Example 11 were added 100 parts of a monomer mixture consisting of 90 parts of ethyl acrylate and 10 parts of acrylic acid (glass transition point of copolymer: 265° K.) and 1 part of benzoyl peroxide, and they were polymerized in the same manner as in Example 11.

The thus-obtained pressure-sensitive adhesive composition had an adhesive strength of 750 g/20 mm and a retention strength of 36 minutes.

While the invention has been described in detail and with reference to specific embodiments thereof, it will be apparent to one skilled in the art that various changes and modifications can be made therein without departing from the spirit and scope thereof.

What is claimed is:

1. A pressure-sensitive adhesive composition containing as a polymer component an addition-polymerization polymer of an acrylate or methacrylate polymer having sticking properties at room temperature and one or more ethylenically unsaturated monomers capable of forming a homo- or co-polymer having a glass transition point of at least 273° K., said addition-polymerization polymer being produced by polymerizing one or more ethylenically unsaturated monomers in the presence of the acrylate or methacrylate polymer having sticking properties at room temperature, wherein the ethylenically unsaturated monomer is selected from at least one member of the group consisting of (a) styrene and a styrene derivative, (b) vinyl acetate, (c) acrylonitrile, (d) methacrylonitrile, (e) an acrylate derivative, and (f) a methacrylate derivative, each being capable of forming a homopolymer having a glass transition point of at least 273° K.

2. A pressure-sensitive adhesive composition as in claim 1 wherein the ethylenically unsaturated monomer comprises an unsaturated monomer selected from at least one member of the group consisting of styrene, vinyl acetate, acrylonitrile, methacrylonitrile, an acrylate derivative, a methacrylate derivative, and a styrene derivative, each being capable of forming a homopolymer having a glass transition point of at least 273° K., and an unsaturated monomer which is capable of copolymerizing with said ethylenically unsaturated monomer to form a copolymer having a glass transition point of at least 273° K., said latter unsaturated monomer constituting not more than 50% by weight of the total unsaturated monomer weight.

3. A pressure-sensitive adhesive composition as in claim 2 wherein the latter unsaturated monomer constitutes not more than 30% by weight of the total unsaturated monomer weight.

4. A pressure-sensitive adhesive composition as in claim 2, or 3 wherein the unsaturated monomer selected from the group consisting of an acrylate derivative, a methacrylate derivative, and a styrene derivative is able to form a homopolymer having a glass transition point of at least 300° K.

5. A pressure-sensitive adhesive composition as in claim 4 wherein the methacrylate is methyl methacrylate.

6. A pressure-sensitive adhesive composition as in claim 1, 2 or 3 wherein the acrylate or methacrylate polymer has an average molecular weight of at least about 100,000.

7. A pressure-sensitive adhesive composition as in claim 1, or 2 wherein the ethylenically unsaturated monomer is used in an amount of from 5 to 200 parts by weight per 100 parts by weight of the acryl-based polymer.

8. A pressure-sensitive adhesive composition as in claim 1, 2, or 3 wherein the ethylenically unsaturated monomer is added in an amount of from 10 to 150 parts by weight per 100 parts by weight of the acrylate or methacrylate polymer.

9. A pressure-sensitive adhesive composition as in claim 1, 2, or 3 wherein the addition-polymerization is carried out in the presence of an organic solvent.

10. A pressure-sensitive adhesive composition as in claim 9 wherein the amount of the organic solvent is from 5 to 900 parts by weight per 100 parts by weight of the acrylate or methacrylate polymer.

11. A pressure-sensitive adhesive composition as in claim 9 wherein the organic solvent is toluene or a mixed solvent containing at least 50% by weight toluene.

12. A pressure-sensitive adhesive composition as in claim 1, 2, or 3 wherein the addition-polymerization is carried out in the absence of an organic solvent.

13. A pressure-sensitive adhesive composition as in claim 12 wherein a chain transfer agent is added in an amount of from 0.01 to 1.0 parts by weight per 100 parts by weight of the ethylenically unsaturated monomer.

14. A pressure-sensitive adhesive composition as in claim 1, 2 or 3 wherein an organic peroxide is used as as polymerization catalyst.

15. A pressure-sensitive adhesive composition as in claim 1, 2, or 3 wherein a crosslinking agent is added to the polymer component after the addition-polymerization in an amount of 0.001 to 1.5 parts by weight per 100 parts by weight of the acrylate or methacrylate polymer.

16. A pressure-sensitive adhesive composition as in claim 10 wherein the amount of the organic solvent is from 25 to 400 parts by weight per 100 parts by weight of the acrylate or methacrylate polymer.

17. A pressure-sensitive adhesive composition as in claim 13 wherein the chain transfer agent is added in an amount of from 0.03 to 0.6 parts by weight per 100 parts by weight of the ethylenically unsaturated monomer.

* * * * *